United States Patent [19]

Aoyagi et al.

[11] Patent Number: 5,170,458
[45] Date of Patent: Dec. 8, 1992

[54] OPTICAL FIBER LIGHT-AMPLIFIER SYSTEM

[75] Inventors: Toshitaka Aoyagi; Kimio Shigihara, both of Itami, Japan

[73] Assignee: Mitsubishi Denki Kabushiki Kaisha, Tokyo, Japan

[21] Appl. No.: 763,215

[22] Filed: Sep. 20, 1991

[30] Foreign Application Priority Data

Nov. 26, 1990 [JP] Japan ................................ 2-324260

[51] Int. Cl.$^5$ ............................................. G02B 6/22
[52] U.S. Cl. ................................... 385/127; 385/123; 385/128; 372/6
[58] Field of Search ................ 372/6; 385/123, 126, 385/127, 128, 142

[56] References Cited

U.S. PATENT DOCUMENTS

| | | | |
|---|---|---|---|
| 4,257,676 | 3/1981 | Greubel et al. | 385/142 |
| 4,733,929 | 5/1988 | Brown | 385/123 |
| 4,815,079 | 3/1989 | Snitzer et al. | 372/6 |
| 4,923,279 | 5/1990 | Ainsue et al. | 372/6 |
| 5,048,026 | 9/1991 | Shaw et al. | 372/6 |
| 5,101,090 | 3/1992 | Coyle, Jr. et al. | 385/123 |

OTHER PUBLICATIONS

Vodhanel et al., "Highly Efficient 978nm Diode-Pumped Eribum-Doped Fibre Amplifier with 24dB Gain", Electronics Letters, vol. 25, No. 20, Sep. 1989, pp. 1386–1388.

Primary Examiner—John D. Lee
Assistant Examiner—S. W. Barns
Attorney, Agent, or Firm—Leydig, Voit & Mayer

[57] ABSTRACT

An improved optical fiber light-amplifier includes an amplifier optical fiber with a center core through which signal light is propagated, and a pumping light generating device which applies pumping light obliquely to the optical fiber. Pumping light is repetitively reflected within the optical fiber from portions of the optical fiber other than the interface between the core and regions surrounding the core. While pumping light is propagated through the fiber, it is absorbed by and excites the center core to amplify signal light being propagated through the optical fiber.

2 Claims, 3 Drawing Sheets

OPTICAL FIBER LIGHT-AMPLIFIER SYSTEM

The present invention relates to an optical fiber light-amplifier system which provides direct amplification of light, and more particularly, to such a system which can be pumped with a high pumping efficiency by pumping light.

BACKGROUND OF INVENTION

FIG. 1 shows an example of conventional optical fiber light-amplifier system. A conventional single-mode optical fiber 21 through which input signal light is propagated is coupled to a first input 61 of an optical coupler 2, and a similar single-mode optical fiber 22 for propagating pumping laser light is coupled to a second input 62 of the optical coupler 2. For example, an erbium-doped optical fiber 4, which provides an optical fiber for light amplification, is coupled to the output 63 of the optical coupler 2. The output end of the erbium-doped optical fiber 4 is coupled to an ordinary single-mode output optical fiber 23 for transmission of amplified signal light.

The optical fibers 21, 22 and 23 comprise cores 31, 32 and 33 having circular cross-sections, and claddings 41, 42 and 43 having annular cross-sections surrounding the associated cores 31, 32 and 33, respectively. In general, the cores and claddings are formed of quartz glasses or the like having different indexes of refraction. The optical fibers are protected by respective protecting coatings covering the claddings.

Similarly, the light amplifying optical fiber 4 comprises a core 34 having a circular cross-section and a cladding 44 having an annular cross-section, and the core 34 and the cladding 44 are formed of quartz glasses or the like having different indexes of refraction. The core 34 is doped with ions of a rare earth element, such as Er (erbium), Nd (neodymium), Yb (ytterbium), Sm (samarium), and Pr (praseodymium). The rare earth element to be used for the doping is determined in accordance with the wavelength of the input signal light and the wavelength of the pumping laser light. For example, for input signal light having a wavelength of 1.55 $\mu$m and pumping laser light having a wavelength of 1.48 $\mu$m, the core 34 is doped with Er ions. The optical fiber 4 is protected by a protecting coating covering the cladding 44, as in the case of the optical fibers 21, 22 and 23.

In operation, input signal light 6 having a wavelength of 1.55 $\mu$m transmitted through the conventional single-mode optical fiber 21 from a remotely located semiconductor laser device (not shown) and enters into the optical coupler 2. Pumping laser light 10 having a wavelength of 1.48 $\mu$m and emitted by a pumping, high output semiconductor laser device 8 is focused by a condenser lens 12 and enters into the core 32 through the end of the pumping laser light transmitting optical fiber 22. The 1.48 $\mu$m wavelength pumping light 14 applied to the optical fiber 22 is propagated therethrough and applied to the optical coupler 2.

Within the optical coupler 2, the 1.48 $\mu$m wavelength pumping light 14 and the 1.55 $\mu$m wavelength input signal light 6 are introduced into the same waveguide and, thereafter, outputted to the Er-doped optical fiber 4. As is well-known, by pumping the core 34 of the Er-doped optical fiber 4 with pumping light 14 at a wavelength of 1.48 $\mu$m, input signal light at a wavelength of 1.55 $\mu$m is amplified through stimulated emission, and amplified input signal light 16 at a wavelength of 1.55 $\mu$m is fed to the conventional single-mode output optical fiber 23 through which it is propagated to another location. If necessary, a filter (not shown) which allows only light of a desired wavelength to pass therethrough may be disposed before the optical fiber 23.

In the conventional optical fiber light-amplifier system with the above-described arrangement, in order to obtain the desired amplification, it is necessary to couple high output power pumping laser light from the high output semiconductor laser device 8 to one end of the core 32 of the single-mode optical fiber 22. The diameter of the core 32 of the optical fiber 22 is only several microns, for example, from about 5 $\mu$m to about 10 $\mu$m at most. Accordingly, only high output semiconductor laser light having its transverse modes sufficiently controlled in a high power output operating state of the laser device can efficiently enter as pumping light into the core 32. However, in the state of art, it is very difficult to provide a laser device which can produce pumping laser light with high output power and stable transverse modes.

An object of the present invention is to provide an optical fiber light-amplifier system in which efficient pumping can be provided with a high output power semiconductor pumping laser device which provides laser light without a high degree of control of its transverse modes.

SUMMARY OF THE INVENTION

An optical fiber light-amplifier system according to the present invention includes an amplifier optical fiber having a center core in which signal light is propagated. Pumping light is introduced into the amplifier fiber including the center core in such a manner that the pumping light is repetitively reflected within the amplifier optical fiber other than at the interface between the center core and a region surrounding the core, while it is propagated through the amplifier fiber. While the pumping light is reflected and propagated, it is absorbed in and excites the center core, whereby the signal light traveling through the center core is efficiently amplified.

As described above, according to the present invention, pumping light introduced into an optical fiber is propagated through the optical fiber, while being reflected within the optical fiber, and when the pumping light traverses a center core obliquely it is absorbed by the core. In this way, the pumping light is subjected to repetitive reflection within the optical fiber and absorption by the center core, while it is being propagated through the fiber, whereby signal light being propagated through the center core is efficiently amplified.

DESCRIPTION OF PREFERRED EMBODIMENTS

Figure 1:
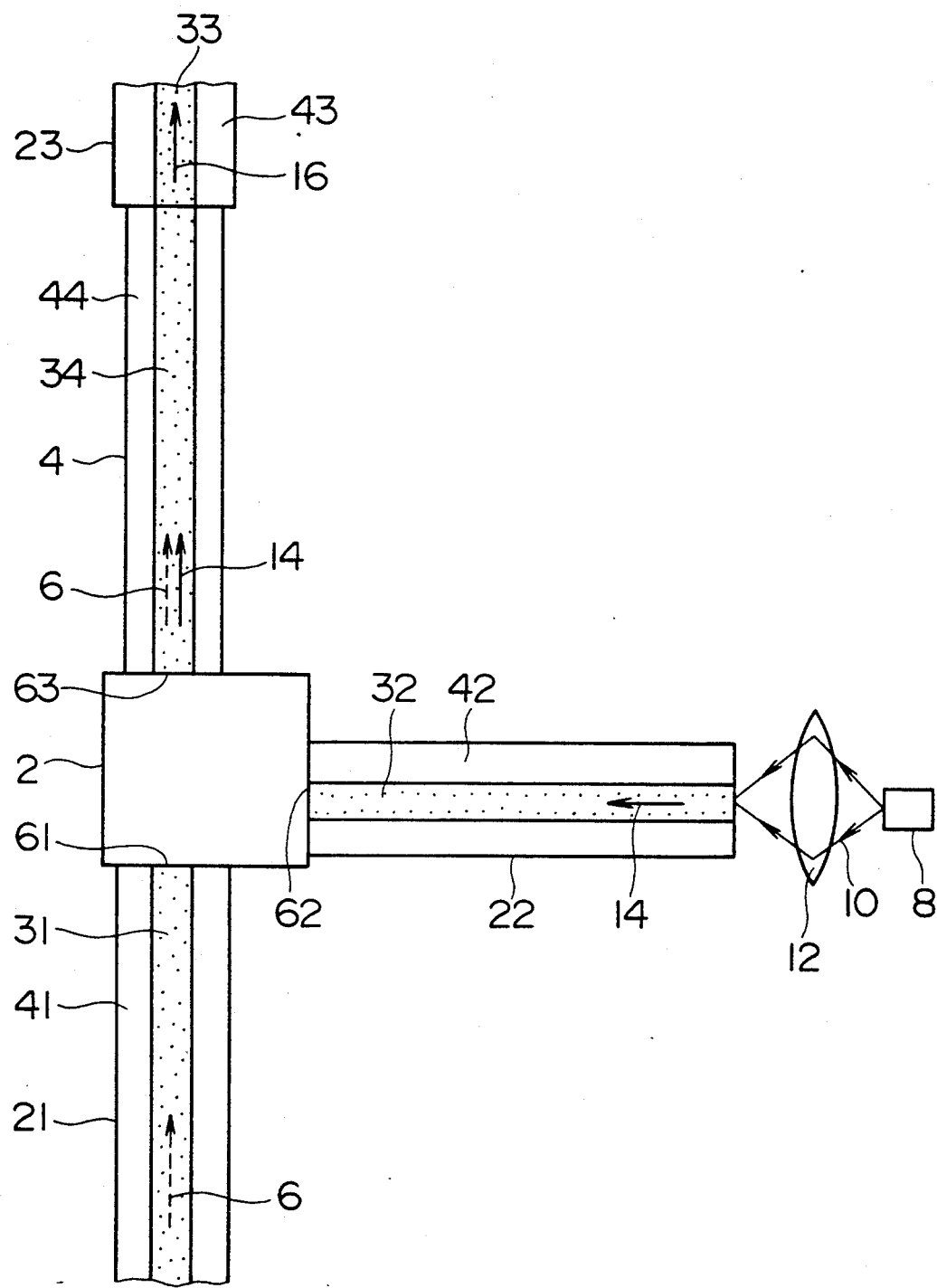
FIG. 1 schematically shows an example of a conventional optical fiber light-amplifier system.

Now the present invention is described in detail by means of preferred embodiments. In FIGS. 2 and 3, the same reference numerals as used in FIG. 1 denote similar components or functions.

FIG. 2 shows an optical fiber light-amplifier system according to a first embodiment of the present invention.

Figure 2:
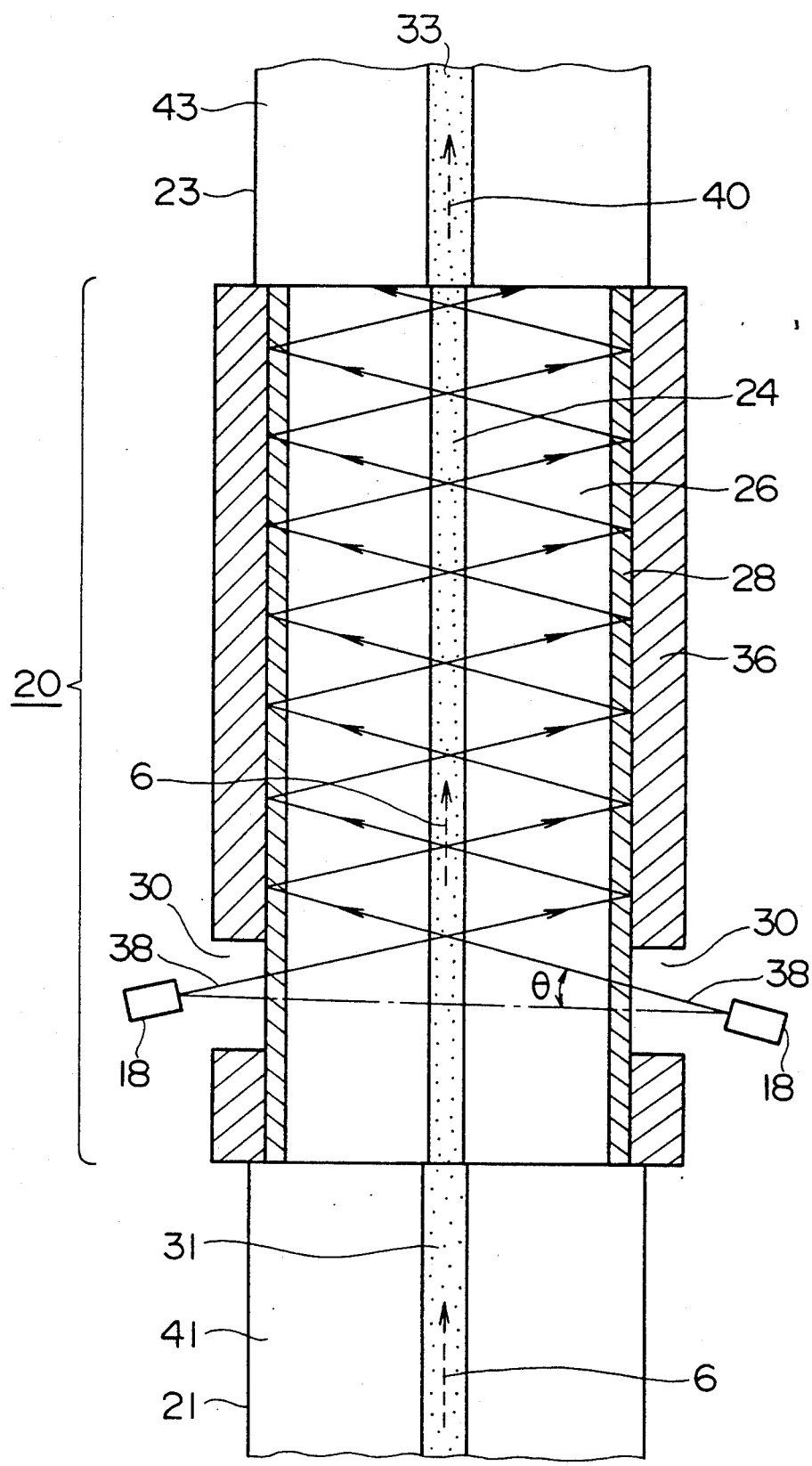
FIG. 2 schematically shows an optical fiber light-amplifier system according to a first embodiment of the present invention.
Figure 3:
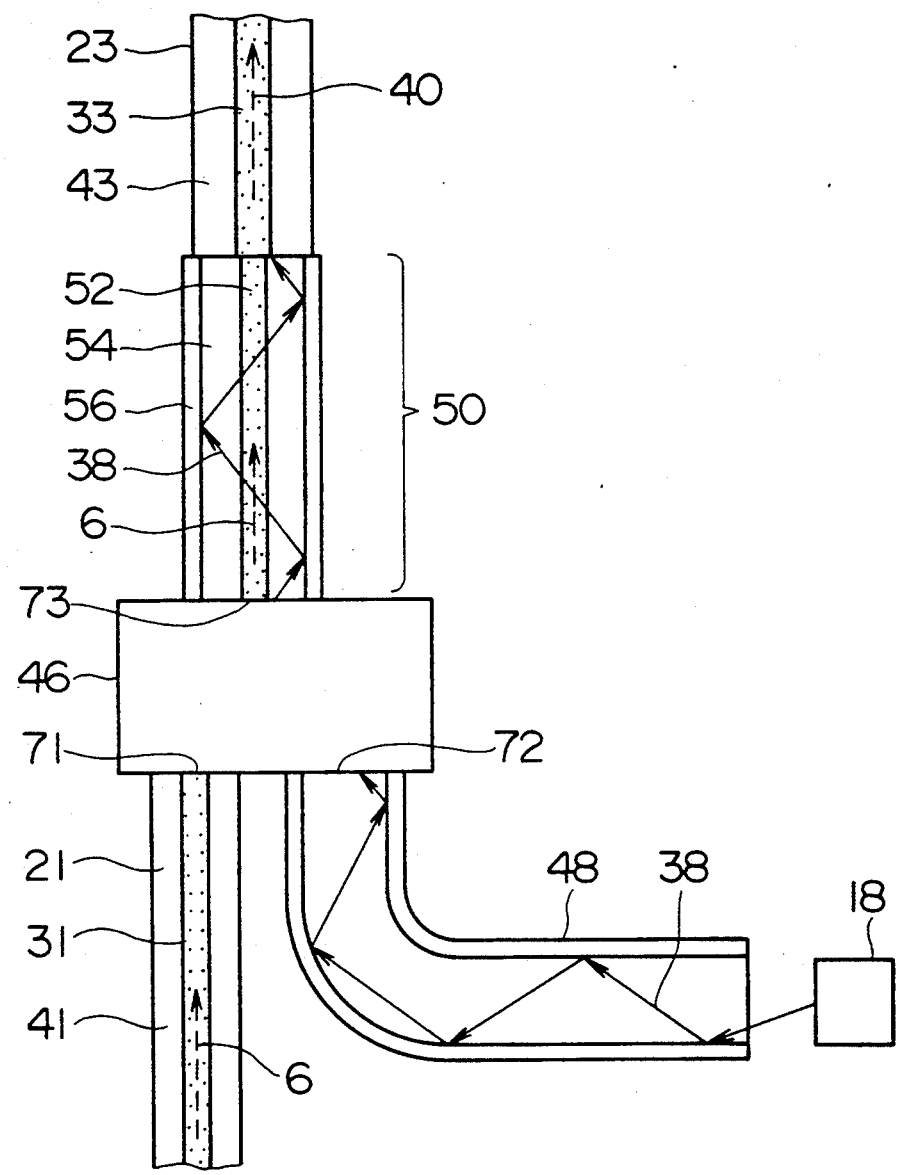
FIG. 3 schematically shows an optical fiber light-amplifier system according to a second embodiment of the present invention.

In FIG. 2, a single-mode optical fiber 21 similar to the fiber 21 of FIG. 1 for transmitting therethrough input signal light to be amplified is coupled to an input end of an amplifier optical fiber 20 which is part of an optical fiber light-amplifier system of the present invention. Another single-mode optical fiber 23 for transmitting amplified signal light is coupled to an output end of the amplifier optical fiber 20.

The optical fiber 21 includes a core 31 having a circular cross-section and a cladding 41 having an annular cross-section and surrounding the core 31. Similarly, the optical fiber 23 includes a core 33 having a circular cross-section and a cladding 43 having an annular cross-section and surrounding the core 33. The cores 31, 33 and the claddings 41, 43 are of quartz glasses having mutually different indexes of refraction. Usually, protective coatings (not shown) protect the respective optical fibers 21, 23.

The amplifier optical fiber 20 includes a core 24 having a circular cross-section, a cladding 26 having an annular cross-section and surrounding the core 24, a non-reflecting film 28 surrounding the cladding 26, and a high-reflectivity film 36 surrounding the non-reflecting film 28. The high-reflectivity film 36 includes window regions 30 through which pumping light is introduced. The core 24 and the cladding 26 are formed of quartz glass and have different indexes of refraction. The optical fiber 20, in particular the core 24, is doped with ions of an rare earth element, such as Er, Nd, Yb, Sm and Pr. The doping element is determined in accordance with the wavelengths of input signal light and pumping laser light. For input signal light at a wavelength of about 1.53–1.55 $\mu$m and pumping laser light at a wavelength of 0.98 $\mu$m, 1.48 $\mu$m, or the like, Er ions are used for doping. In the illustrated embodiment, input signal light has a wavelength of, for example, 1.55 $\mu$m and pumping laser light has a wavelength of, for example, 1.48 $\mu$m. Accordingly, an Er-doped optical fiber is used.

The diameter of the core 24 having a circular cross-section is dependent on the wavelengths of light used, but the outer diameter of the cladding 26 with an annular cross-section is about 125 $\mu$m. For light at a wavelength of 0.48 $\mu$m or so, the diameter of the core 24 is about 3 $\mu$m, for light at a wavelength of 0.63 $\mu$m or so, it is about 4 $\mu$m, and for light at a wavelength of 0.85 $\mu$m or so, it is about 5 $\mu$m. For light having a wavelength of from 1.3 $\mu$m to 1.55 $\mu$m, the diameter of the core 24 is about 9 $\mu$m. As stated above, because the illustrated embodiment employs input signal light at a wavelength of 1.55 $\mu$m and pumping laser light at a wavelength of 1.48 $\mu$m, the outer diameter of the core 24 is about 9 $\mu$m.

As the non-reflecting film 28, a film of a dielectric material, such as $SiO_2$, $Al_2O_3$ and $Si_3N_4$, may be used. Such dielectric films act as non-reflecting or low-reflectivity films, but both of them are referred to as "non-reflecting films" in this specification.

As the high-reflectivity film 36, a metal film, such as Au, Al and Ag, or a dielectric multi-layered film, such as an $SiO_2$/Si multi-layered film, an $Al_2O_3$/Si multi-layered film and and $Si_3N_4$/Si multi-layered film, may be used.

In operation, signal light 6 at a wavelength of 1.55 $\mu$m propagated through the conventional single-mode optical fiber 21 from a remotely located semiconductor laser device (not shown) is introduced into the core 24 of the Er-doped amplifier optical fiber 20. Pumping laser beams 38 at a wavelength of 1.48 $\mu$m generated by high output power semiconductor pumping lasers 38 enter the optical fiber 20 through the window regions 30 in the high-reflectivity film 36 and through the non-reflecting film 28. In this case, the angle $\theta$ shown in FIG. 2, which is the angle of entrance of the pumping laser beams 38 into the optical fiber 20, with respect to the direction normal to the non-reflecting film 28 in the window region 30, is determined to be $0° < \theta < 90°$ i.e., oblique relative to the cladding 26 and the non-reflecting film 28.

Because the non-reflecting film 28 is present within the window regions 30, substantially all of the pumping laser light beams 38 can enter into the cladding 26 and reach the core 24 of the Er-doped optical fiber 20. Part of each of the pumping laser beams 38 at a wavelength of 1.48 $\mu$m is absorbed by the core 24, and those portions of the beams 38 which have not been absorbed by the core 24 advance further through the cladding 26 and are reflected from the high-reflectivity film toward the core for absorption by the core 24 while they travel through the core 24. In this way, the pumping laser beams 38 introduced into the optical fiber 20 through the window regions 30 are absorbed by the core 24, while they propagate in the optical fiber 20, being repetitively reflected by the high-reflectivity film 36. Thus, the pumping laser beams excite the core 24 to amplify the signal light 6 at a wavelength of 1.55 $\mu$m. The thus amplified signal light having a wavelength of 1.55 $\mu$m is fed to the conventional single-mode output optical fiber 23 for transmission therethrough to another location, as amplified signal light 40. If necessary, a filter (not shown) may be disposed between the optical fibers 20 and 23 so as to allow only light at the desired wavelength to pass.

As stated previously, in conventional optical fiber light-amplifier systems such as shown in FIG. 1, pumping laser light must be made to enter into a core of several microns diameter through an end surface of an optical fiber, and, therefore, it is necessary to use a laser device which can provide laser light with highly controlled transverse modes so that it can efficiently enter into such an optical fiber core. However, since it is difficult to obtain a laser device which can provide high output power laser light with highly controlled transverse modes, it has been difficult to obtain a high gain for conventional optical fiber light-amplifier systems.

In contrast, in the system according to the embodiment of the present invention shown in FIG. 2, the pumping laser beams 38 are introduced into the cladding 26, rather than the core 24, which has a significantly larger diameter than the core 24. Accordingly, a high output power laser device, such as, for example, a broad-area semiconductor laser device, which provides laser light having poorly controlled transverse modes can be used as a pumping laser light source. Pumping light, therefore, can be efficiently absorbed by the core 24 of the Er-doped optical fiber 20 to sufficiently amplify the signal light 6 for transmission to the conventional single-mode output optical fiber 23.

In the system shown in FIG. 2, an optical lens system may be used to collimate or focus laser light provided by the laser devices 18 before it is applied to the amplifier optical fiber 20 so that the core 24 can be excited with a higher efficiency to provide higher amplification.

In the system of FIG. 2, pumping light beams are applied to the core 24 from two symmetrically opposite directions, but one laser beam may be introduced from one direction through one window region in the high-reflectivity film 36, or more than two window regions may be formed in the film 36 around the cladding 26 for letting pumping laser light enter into the fiber 20.

Further, the diameter and the outer shape of the cladding 26 can be other than described.

The non-reflecting film 28 may be disposed only within the window regions 30, or it may not be used. When no non-reflecting film is used, the pumping laser light input efficiency may slightly decrease, but such a decrease in efficiency can be compensated for to provide desired amplification, by using sufficiently high output laser devices as the pumping laser devices 18.

Further, the high-reflectivity film 36 may be omitted in the embodiment shown in FIG. 2. Without the film 36, the pumping laser beams 38 are reflected from the interface between the cladding 26 and the ambient back into the core 24, and part of the pumping laser beams will travel across the interface into the ambient. According to the present invention, pumping laser light need not be highly controlled in its transverse modes and, accordingly, high output power laser devices can be used as the pumping laser devices 18, so that the signal light 6 can be amplified by a sufficient amplification factor.

FIG. 3 shows an optical fiber light-amplifier according to a second embodiment of the present invention. A conventional single-mode input signal light propagating optical fiber 21 for transmitting signal light 6 having a wavelength of, for example, 1.55 μm, is coupled to a first input port 71 of an optical coupler 46 of a well-known type. A multi-mode optical fiber 48 for propagating pumping laser light 38 from a pumping light generating semiconductor laser device 18, is coupled to a second input port 72 of the optical coupler 46.

An amplifiying optical fiber 50 is coupled to an output port 73 of the optical coupler 46. In the illustrated embodiment, the amplifying optical fiber 50 includes a first core 52 through which signal light 6 is propagated, a second core 54 surrounding the first core 52 through which pumping light 38 is propagated, and a cladding 56 which acts as a high-reflectivity coating. The first core 52, the second core 54 and the cladding 56 are formed of, for example, quartz glass, and have mutually different indexes of refraction. The materials are selected such that the indexes of refraction are in a relation, $n_1 > n_2 > n_3$, where $n_1$ is the index of refraction of the first core 52, $n_2$ is the index of refraction of the second core 54, and $n_3$ is the index of refraction of the cladding 56. At least part of the double-core amplifier optical fiber 50, and at least one of the first and second cores 52 and 54, and, in particular, the first core 52 is doped, for example, with Er ions ($Er^{3+}$). Depending on the wavelengths of light to be propagated, other rare earth elements, such as Nd, Yb, and Sm, or Al may be used for doping.

In the embodiment shown in FIG. 3, signal light 6 having a wavelength of, for example, 1.55 μm propagated through the optical fiber 21 is introduced into the first core 52 of the amplifier optical fiber 50 through the optical coupler 46, and pumping light 38 having a wavelength of, for example, 1.48 μm emitted by a semiconductor laser device 18 is propagated by reflection through the multi-mode optical fiber 48 and is then introduced into the second core 54 of the amplifier optical fiber 50 through the optical coupler 46. The pumping light 38 introduced into the second core 54 of the amplifier optical fiber 50 is propagated through the fiber 50, and repetitively reflected by the cladding 56. When the pumping light 58 crosses the first core 52, it is absorbed by the core 52 and excites the core 52. Thus, the signal light 6 being propagated through the first core 52 is amplified. The thus amplified signal light 40 is applied to and propagated through a conventional single-mode output optical fiber 23. As in the embodiment shown in FIG. 2, a filter may be disposed between the amplifier optical fiber 50 and the output optical fiber 23.

In the embodiment illustrated in FIG. 3, the pumping light 38 is introduced into the amplifier optical fiber 50 through the end surface of the second core 54 at an angle of incidence $\theta \approx 90°$.

In the embodiment of FIG. 3, too, the cross-sectional area of the second core 54 of the amplifier optical fiber 50 is substantially larger (by a factor of several tens to several hundreds) than that of the first core 52. Accordingly, high output power light of which the transverse modes have not been controlled sufficiently can be applied with high efficiency to the amplifier optical fiber 50 so that signal light can be amplified with a high amplification factor.

As described above, according to the present invention, a high output power laser light generating device in which it is extremely difficult to provide transverse-mode control can be used as a pumping laser light generating device for effectively pumping signal light, and, thus, a high gain can be attained easily. Assuming that pumping light has, for example, ten (10) transverse modes with the same gain, the pumping light coupling efficiency of the single-mode optical fiber 22 in the conventional system shown in FIG. 1 is only 10% or so at most, but it can be increased to approximately 100% by properly determining the size of the window(s) 30 (FIG. 2), or by properly choosing the size of the second core 54 (FIG. 3). Thus, an amplification factor which is ten or more times larger than that of the system of the conventional system can be attained.

What is claimed is:

1. An optical fiber light-amplifier system comprising:
   an amplifying optical fiber having a core through which signal light propagates, a cladding disposed on and surrounding said core, a non-reflecting film disposed on and surrounding said cladding, and a high-reflectivity film surrounding said non-reflecting film, said high-reflectivity film having a window exposing a portion of said non-reflecting film; and
   a pumping light generating device for generating and introducing pumping light into said optical fiber through the window and oblique to said cladding wherein the pumping light is absorbed by said core while propagating through said optical fiber and is repetitively reflected within said optical fiber, exciting said core, whereby the signal light is amplified.

2. An optical fiber light-amplifier system according to claim 1 wherein said core through which signal light propagate is doped with a rare earth element.

* * * * *